(No Model.)

R. O. SPROGLE.
EXPANDING BUNG.

No. 361,030. Patented Apr. 12, 1887.

Witnesses:—
Louis M. F. Whitehead.
Charles A. Loring

Inventor:—
Ralph O. Sprogle.
by— Dayton & Poole
Attorneys.—

UNITED STATES PATENT OFFICE.

RALPH O. SPROGLE, OF CHICAGO, ILLINOIS, ASSIGNOR OF ONE-HALF TO JAMES E. LOW, OF SAME PLACE.

EXPANDING BUNG.

SPECIFICATION forming part of Letters Patent No. 361,030, dated April 12, 1887.

Application filed March 3, 1887. Serial No. 229,550. (No model.)

*To all whom it may concern:*

Be it known that I, RALPH O. SPROGLE, of Chicago, in the county of Cook and State of Illinois, have invented certain new and useful Improvements in Bungs; and I do hereby declare that the following is a full, clear, and exact description thereof, reference being had to the accompanying drawings, and to the letters of reference marked thereon, which form a part of this specification.

This invention relates to that class of bungs or stoppers for the openings of barrels, fruit-jars, and similar openings of vessels, in which a rubber disk is vertically compressed, and thereby laterally expanded to tightly fill and close the opening.

The invention has for its object to provide a more simple and cheap and at the same time more effective and easily-operated construction than has heretofore been made in this class of bungs or stoppers.

To this end the invention consists in the construction and combination of four parts, as hereinafter described and claimed.

Figure 1:
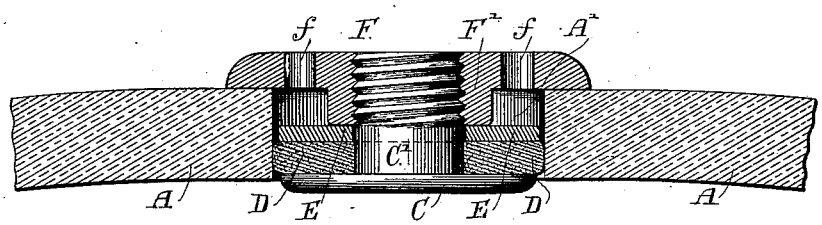
Figure 2:
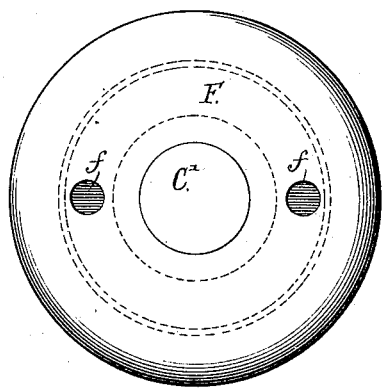

In Figure 1 of the drawings the bung or stopper is shown with three of its four parts in central vertical section as applied to the bung-hole of a barrel, and Fig. 2 shows the stopper in top view.

A represents a barrel or other vessel having a bung-hole, A', to which the bung or stopper is to be applied.

B is the bung or stopper, which is composed of four parts—to wit, C, a disk of metal, slightly smaller than the hole A', and having a short screw-threaded central shank, C', rising therefrom; D, a centrally-apertured disk, of soft rubber or other elastic material, surrounding the shank C', and normally a little smaller than the hole it is to close; E, a thin metal disk loosely surrounding the shank C', and resting upon the rubber disk D; and F, a metal disk larger than the hole A', provided with a central depending boss, F', which is smaller than the hole A', and has a screw-threaded passage loosely fitted to the shank C', and which bears by a narrow surface upon the metal disk E. The disk F has two oppositely-arranged holes, *ff*, or other equivalent provision for a spanner-wrench, by which to rotate said disk, as a nut, to draw the disk C upward.

The operation of the whole is obvious. When the disk-nut F is run outwardly on the shank C', the rubber disk D assumes its normal diameter, and is free to be inserted into or withdrawn from the bung-hole, and when the said disk-nut F is run down upon the shank C' the rubber disk is vertically compressed between disks C and E, and is correspondingly expanded until it tightly fills the hole A'. By providing a narrow surface-bearing between the depending boss F' and the disk E, close to the screw-threaded shank C' and making the screw free, the rotation of the disk-nut F is made practicable when the rubber disk barely touches the walls of the bung-hole, so that rotation of the rubber and the other lower disks, in first tightening the bung, is prevented. After the rubber disk has been forced more firmly into contact with the walls of the hole A, the same narrow bearing of F' upon the disk E correspondingly lessens the tendency to rotate the lower disks in rotating the disk-nut, and the peripheral surface of the rubber is therefore not torn or injured so as to impair the tightness of the joint.

In the construction described, consisting of only the four parts mentioned, the disk-nut F, of necessity, rotates, and in doing so necessarily slips upon the surface of the barrel or vessel beneath the outer margin of said nut. This, however, is found unobjectionable in practice, since a wrench-lever of suitable length may be employed to easily overcome this friction, in addition to effecting the expansion of the rubber disk within the hole, while the omission of a fifth part, in the shape of a separate nut, avoids an unallowable or objectionable projection, and at the same time gives ample thickness to the several parts within the limitations of the thickness of a barrel-stave.

I claim as my invention—

An expansible bung or stopper composed of the four following parts—to wit, a lower disk, C, provided with a central screw-threaded shank, C', an annular rubber disk, D, resting on the disk C, a superposed annular metal disk, E, all less in diameter than the bung-hole, and a disk-nut, F, larger than the bung-hole, provided with a central depending boss, F', having a narrow bearing upon the disk E and provided with a screw-threaded opening fitted to the shank C', substantially as described.

In testimony that I claim the foregoing as my invention I affix my signature in presence of two witnesses.

RALPH O. SPROGLE.

Witnesses:
C. CLARENCE POOLE,
CHARLES T. LORING.